(12) United States Patent
Zlatnik

(10) Patent No.: US 9,087,127 B1
(45) Date of Patent: Jul. 21, 2015

(54) METHOD FOR PROVIDING AN INTEGRATED VIDEO MODULE

(71) Applicant: Pavel Zlatnik, Prague (CZ)

(72) Inventor: Pavel Zlatnik, Prague (CZ)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 13/854,684

(22) Filed: Apr. 1, 2013

(51) Int. Cl.
*H04N 5/92* (2006.01)
*G06F 17/30* (2006.01)

(52) U.S. Cl.
CPC .................................. *G06F 17/3082* (2013.01)

(58) Field of Classification Search
None
See application file for complete search history.

(56) References Cited

U.S. PATENT DOCUMENTS

| 2009/0148124 | A1* | 6/2009 | Athsani et al. | 386/46 |
| 2010/0153881 | A1* | 6/2010 | Dinn | 715/825 |
| 2011/0161174 | A1* | 6/2011 | Simms et al. | 705/14.58 |

OTHER PUBLICATIONS

"CA Productivity Accelerator Data Sheet," CA Technologies, Inc., published 2012, available at http://www.ca.com/us/~/media/Files/EducationBriefs/caproductivityaccelerator11x%20brief.pdf (searched on Jul. 1, 2013).
"Oracle User Productivity Kit Data Sheet," Oracle Corporation, published 2012, available at http://www.oracle.com/us/products/applications/user-productivity-kit/065061.pdf (searched on Jul. 1, 2013).

* cited by examiner

*Primary Examiner* — William C Vaughn, Jr.
*Assistant Examiner* — Eileen Adams
(74) *Attorney, Agent, or Firm* — Baker Botts L.L.P.

(57) ABSTRACT

Methods include presenting an integrated video module within an application, in which the integrated video module is integrated into the application. Methods include receiving one or more search terms. Methods include identifying, via a search element of the integrated video module, a particular video associated with at least one of the one or more search terms and stored in an accessible repository. Methods include presenting, via the search element, the particular video. Methods also include recording, via a record element of the integrated video module, a video. Methods include storing, via a publish element of the integrated video module, the video and the one or more further search terms in a local repository. Methods include storing, via the publish element, the video and the one or more further search terms in a public repository in response to receiving a request to share the video.

20 Claims, 8 Drawing Sheets

METHOD FOR PROVIDING AN INTEGRATED VIDEO MODULE

BACKGROUND

The present disclosure relates to computer tutorials and, more specifically, to a system and method for providing an integrated video module.

Existing computing systems may provide a user with a tutorial or help feature. This tutorial feature may be a module that allows the user to view content that is stored locally or remotely. The content may be electronic versions of documents that are in one or more electronic file formats. The user may use these documents to understand how to use an application or an object of the application. The user may also want to use other content such as videos to understand how to use the application, but existing systems may be limited to providing access to the electronic versions of the documents. Moreover, existing systems may not allow the user to make or create new content and to share content.

BRIEF SUMMARY

According to an aspect of the present disclosure, a method may include presenting an integrated video module within an application, in which the integrated video module is integrated into the application. The method may further include receiving one or more search terms. The method may further include identifying, via a search element of the integrated video module, a particular video associated with at least one of the one or more search terms and stored in an accessible repository in response to receiving a request to search for a video. The method may further include presenting, via the search element, the particular video.

According to another aspect of the present disclosure, a method may include receiving one or more further search terms. The method may further include recording, via a record element of the integrated video module, a video in response to receiving a request to record the video. The method may also include associating, via the record element, the video with the one or more further search terms. The method may further include storing, via a publish element of the integrated video module, the video and the one or more further search terms in a local repository. The method may also include storing, via the publish element, the video and the one or more further search terms in a public repository in response to receiving a request to share the video.

Other objects, features, and advantages will be apparent to persons of ordinary skill in the art from the following detailed description and the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
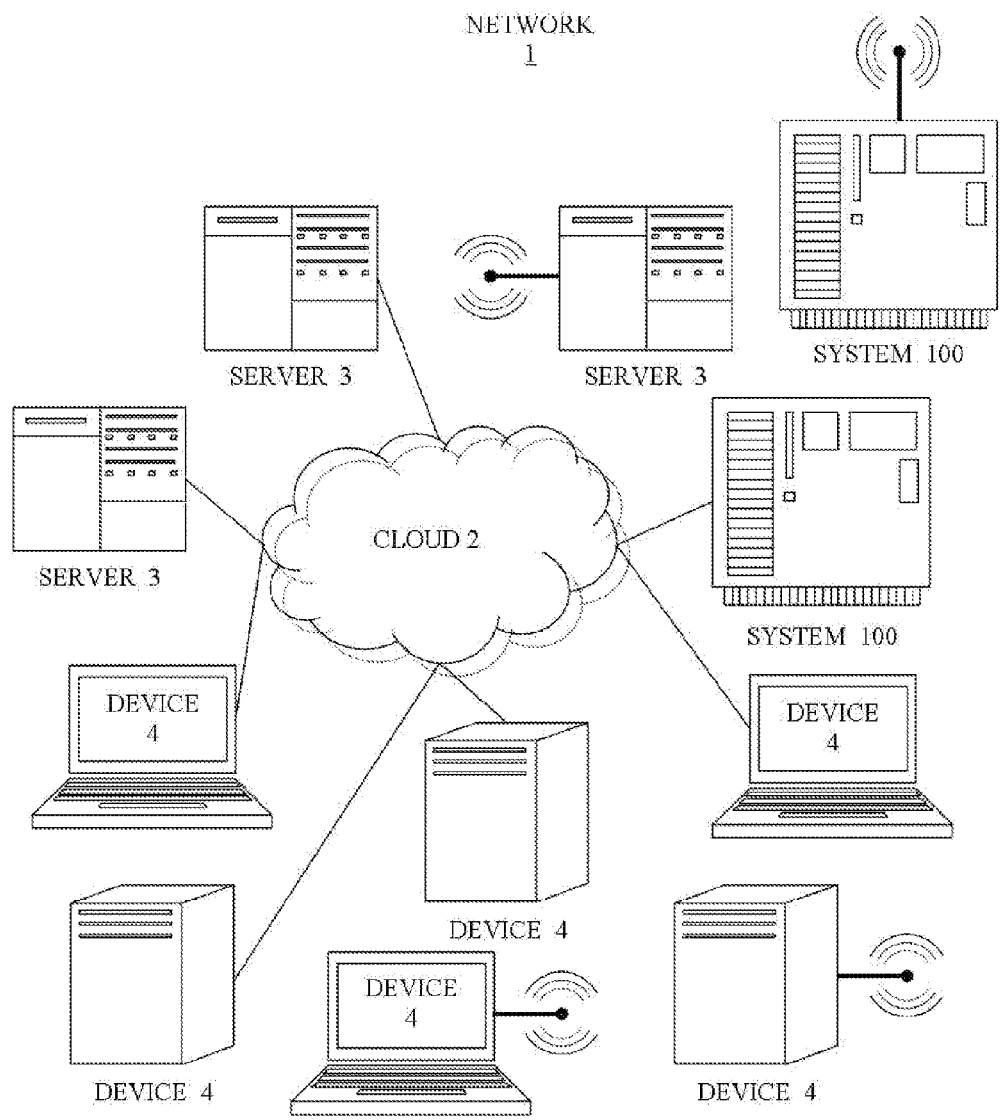
FIG. 1 is a schematic representation of a network for a user to access an integrated video module.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in a combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium able to contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer readable signal medium may be a computer readable medium that is not a computer readable storage medium and that is able to communicate, propagate, or transport a program for use by or in connection with an instruction execution system, apparatus, or device. Program code embodied on a computer readable signal medium may be transmitted using an appropriate medium, comprising but not limited to wireless, wireline, optical fiber cable, RF, etc., or any suitable combination of the foregoing.

Computer program code for carrying out operations for aspects of the present disclosure may be written in a combination of one or more programming languages, comprising an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider) or in a cloud computing environment or offered as a service such as a Software as a Service ("SaaS").

Aspects of the present disclosure are described herein with reference to flowchart illustrations and/or block diagrams of methods, apparatuses (e.g., systems), and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that, when executed, may direct a computer, other programmable data processing apparatus, or other devices to function in a particular manner, such that the instructions, when stored in the computer readable medium, produce an article of manufacture comprising instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices to produce a computer implemented process, such that the instructions which execute on the computer or other programmable apparatus provide processes for implementing the functions/acts specified in the flowchart and/or block diagram block or blocks.

While certain example systems and methods disclosed herein may be described with reference to mainframes in cloud computing, systems and methods disclosed herein may be related to architecture and information technology ("IT") service and asset management in cloud computing, as well as usability and user experience in middleware and common services. Systems and methods disclosed herein may be applicable to a broad range of applications that monitor various parameters associated with various disciplines, such as, for example, IT systems and other activities of importance to the user.

Referring now to computing systems, existing systems may provide a user with a tutorial or help feature. This tutorial feature may be a module that allows the user to view electronic versions of documents. These electronic versions of documents may be in one or more electronic formats such as, for example, Portable Document Format ("PDF") or document file format ("DOC"). The user may use the documents to understand how to use an application or an object of an application. Existing systems may only be able to provide these documents to the user. However, in some instances, the user may want to search for and view a recorded guide instead of a document. The recorded guide may be, for example, a video. Moreover, the user may also want to make or create their own recorded guides and/or share their recorded guides with other users.

System and methods disclosed herein may allow the user to search for a video (e.g., via a search element of an integrated video module), to record their own video (e.g., via a record element of an integrated video module), and to share their video (e.g., via a publish element of an integrated video module) with other users. Such systems and methods may provide an integrated video module. The integrated video module may be integrated into an application. Such systems and methods may present, within the integrated video module, the user with an option to search for one or more videos. Such systems and methods may also present, within the integrated video module, the user with an option to record a video and an option to share the video. Each of these videos may have a name or header and one or more key phrases that describe the video's subject matter. For example, a video that encompasses subject matter on how to migrate datasets may have a header, "How to Migrate a Dataset," and a set of key phrases comprising "Dataset," a description of a task (e.g., migration), a name of a tool that is used for migrating a dataset, and a reason for performing the task (e.g., to free up hard drive space). The header and the one or more key phrases may be used to search for the videos. Moreover, each of these videos may be associated with a name of an object in the application. For example, continuing from the last example, the video may be associated with a name of an object in the application that is used for migrating a dataset or a name of an object in the application that is a part of a structure or tree for migrating a dataset. If the video is associated with a name of an object, then such systems and methods may identify the video as a video that is related to the object. In such cases, the video may be referred to as a "related video." Such systems and methods may also provide an option to display the related video to the user. For example, such systems and methods may display a button with the option to display the related video next to the object on a screen, and the user may select the option by clicking on the button with a cursor. When the user selects the option to view the related video, such systems and methods may further present the related video to the user.

In such systems and methods disclosed herein, there may be three types of videos. A video may be a factory video, wherein the factory video is a video that is provided by a service provider (e.g., a manufacturer, a distributor, a licensor). For example, a company that develops an application with a plurality of objects may provide videos for each of the plurality of objects in the application. These videos may comprise recorded data that instructs a user on one or more actions that can be performed or implemented with each of the plurality of objects. Alternatively, a video may be a private video, wherein the private video is a video that is recorded or made by a user and stored in a local repository. The local repository may be a memory located in a device that the user is using to execute or run the application. For example, continuing from the last example, a customer who purchases the application may record one or more additional videos for their private use. These one or more additional videos may be stored in a hard drive on a computer that the user is running the application on. The user may be an experienced engineer who is recording the one or more additional videos to instruct a beginning user on how to perform a task in the application. Additionally, a video may be a public or shared video, wherein the public video is a video that is recorded or made by a user and stored in a public repository. The public repository may be a memory that is accessible by a group of users that are running the application on different devices. The user that records the video may want to make the video a shared video so that the video can share information and knowledge with many users.

When a user chooses to search for a video, such systems and methods may search among the videos that are stored in one or more repositories that are accessible to that user. These one or more repositories may be referred to as "accessible repositories." The accessible repositories may include one or more local repositories (e.g., a disc storage that stores factory videos, a computer hard drive that stores private videos) and one or more public repositories (e.g., a company server, a cloud storage). The search may comprise finding or identifying one or more videos that are associated with one or more search terms. The one or more search terms may comprise a header, key phrases, and names of objects.

Systems and methods disclosed herein may provide an interactive way for users to share and obtain information about an application's features. Unlike existing systems and methods that only provide access to written content, such systems and methods may provide users with recorded content. The recorded content may comprise video data such as images and audio clips. By viewing the recorded content, users may learn how to perform a task in the application or how to use a feature in the application. Additionally, users can create their own recorded content. For example, experienced engineers can create a video for a beginner engineer in a field. Moreover, after such recorded content is created and stored, it can be used by future generations of users. Service providers that notice that particular recorded content is useful may also include such content as a factory video in a next release of the application.

Furthermore, in some systems and methods, a small change associated with an application may not reduce the usefulness of existing recorded content. Such systems and methods may also provide an efficient way for new recorded content to replace existing recorded content if the application undergoes a significant change. For applications that have a consolidated user interface (i.e., a user interface that is used in a plurality of applications), such systems and methods may also enable the user to quickly learn about using many applications or particular features in many applications.

Referring now to FIG. 1, a network 1 for a user to access and use an integrated video module. Network 1 may comprise one or more clouds 2, which may be public clouds, private clouds, or community clouds. Each cloud 2 may permit the exchange of information and services among users that are connected to such clouds 2. In certain configurations, cloud 2 may be a wide area network, such as the Internet. In some configurations, cloud 2 may be a local area network, such as an intranet. Further, cloud 2 may be a closed, private network in certain configurations, and cloud 2 may be an open network in other configurations. Cloud 2 may facilitate wired or wireless communications of information among users that are connected to cloud 2.

Network 1 may comprise one or more servers 3 and other devices operated by service providers and users. Network 1 also may comprise one or more devices 4 utilized by users. Service providers and users may provide information to each other utilizing the one or more servers 3, which connect to the one or more devices 4 via cloud 2. Servers 3 may comprise, for example, one or more of general purpose computing devices, specialized computing devices, mainframe devices, wired devices, wireless devices, monitoring devices, infrastructure devices, and other devices configured to provide information to service providers and users. Devices 4 may comprise, for example, one or more of general purpose computing devices, specialized computing devices, mobile devices, wired devices, wireless devices, passive devices, routers, switches, mainframe devices, monitoring devices, infrastructure devices, and other devices utilized by service providers and users. Exemplary items may include network 1, cloud 2, servers 3, and devices 4.

Moreover, network 1 may comprise one or more systems 100 that may provide an integrated video module. System 100 may be, for example, one or more of a general purpose computing device, a specialized computing device, a wired device, a wireless device, a mainframe device, an infrastructure device, a monitoring device, and any other device configured to provide an integrated video module. System 100 may also be configured to collect data from one or more data sources (e.g., servers, sensors, networks, interfaces, other devices). System 100 may collect information from network 1, cloud 2, servers 3, devices 4, and other devices connected to cloud 2. System 100 may connect to cloud 2 and monitor network 1, cloud 2, servers 3, devices 4, and other devices connected to cloud 2 for available information. The available information may be user information, access information, performance information, infrastructure information, software or application information, usability information, and other information provided by service providers and users. By collecting the available information from network 1, cloud 2, servers 3, devices 4, and other devices connected to cloud 2, system 100 may perform one or more tasks associated with using the integrated video module. These one or more tasks may comprise searching for a video.

In some configurations, one or more of servers 3 and devices 4 may comprise system 100. In other configurations, system 100 may be separate from servers 3 and devices 4.

Figure 2:
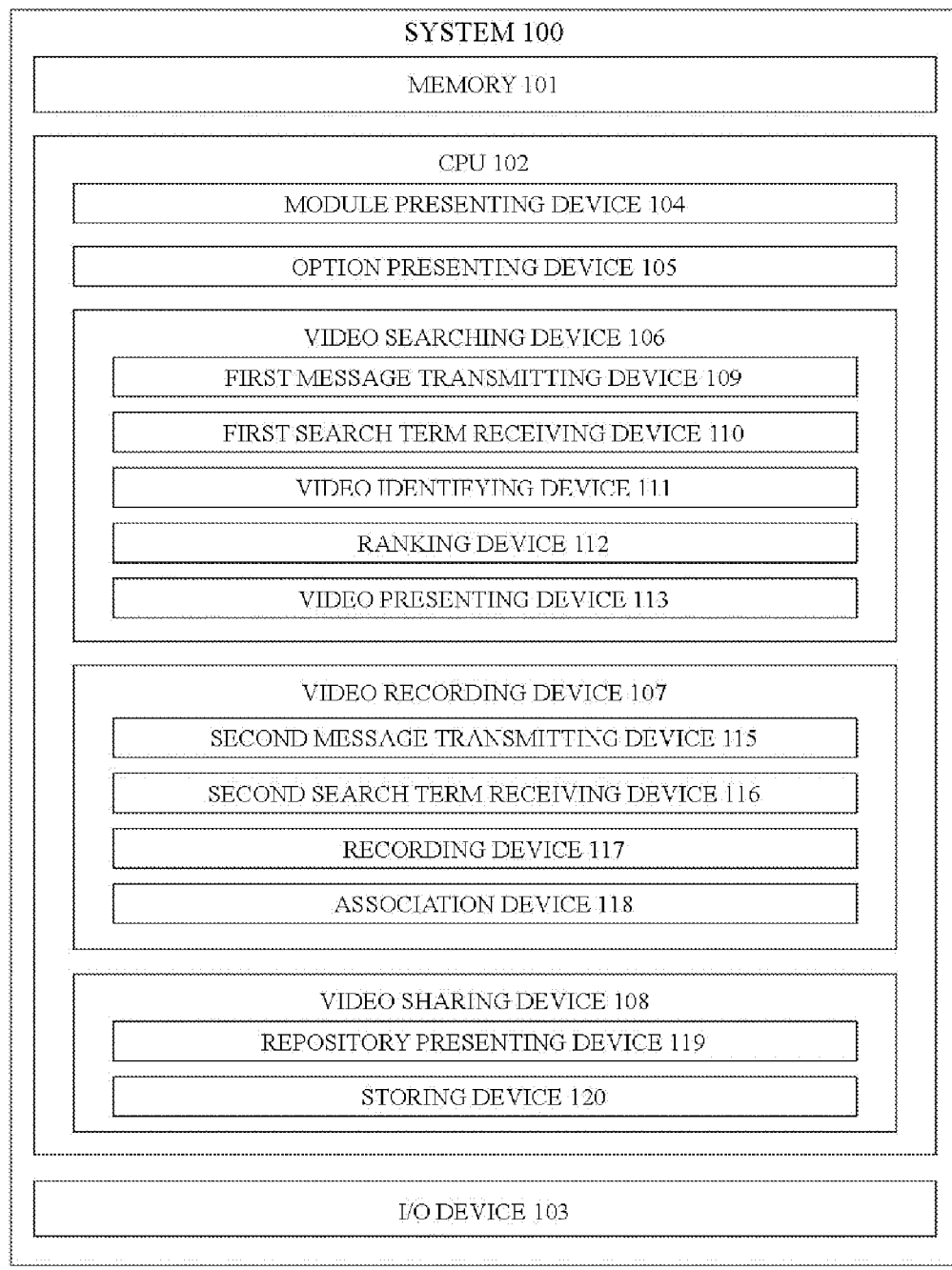
FIG. 2 is a schematic representation of a first system configured to present, within an application, an integrated video module.
Figure 3:
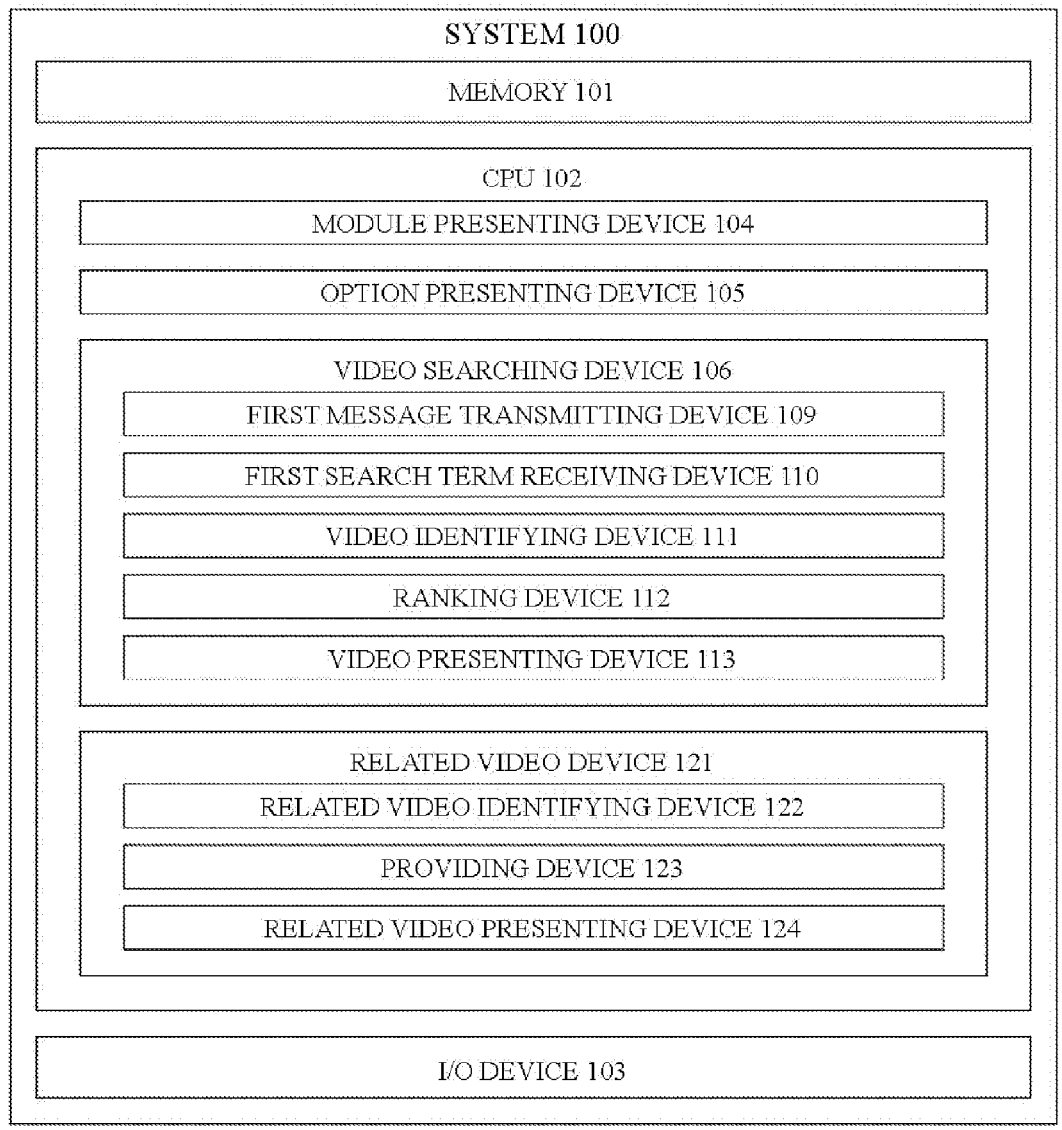
FIG. 3 is a schematic representation of a second system configured to present, within an application, an integrated video module.

Referring now to FIGS. 2 and 3, system 100, which may provide an integrated video module, is now described. System 100 may reside on one or more networks 1. System 100 may comprise a memory 101, a central processing unit ("CPU") 102, and an input and output ("I/O") device 103. Memory 101 may store computer-readable instructions that may instruct system 100 to perform certain processes. In particular, when executed by CPU 102, the computer-readable instructions stored in memory 101 may instruct CPU 102 to operate as one or more devices. In FIG. 2, CPU 102 may operate as one or more of a module presenting device 104, an option presenting device 105, a video searching device 106, a video recording device 107, and a video sharing device 108. Searching device 106 may comprise a first message transmitting device 109, a first search term receiving device 110, a video identifying device 111, a ranking device 112, and a video presenting device 113. Recording device 107 may comprise a second message transmitting device 115, a second search term receiving device 116, a recording device 117, and an association device 118. Video sharing device 108 may comprise a repository presenting device 119 and a storing device 120.

In FIG. 3, system 100 may operate as one or more of a module presenting device 104, an option presenting device 105, a video searching device 106, and a related video device 121. Related video device 121 may comprise a related video identifying device 122, a providing device 123, and a related video presenting device 124.

In certain configurations, CPU 102 may only operate as module presenting device 104, option presenting device 105, and video searching device 106. In other configurations, CPU 102 may only operate as module presenting device 104, option presenting device 105, and video recording device 107. In still other configurations, CPU 102 may only operate as module presenting device 104, option presenting device 105, video recording device 107, and video sharing device 108. In particular configurations, CPU 102 may only operate as module presenting device 104, option presenting device 105, video searching device 106, and video recording device 107. In other configurations, CPU 102 may operate as any of the above combinations in addition to related video device 121. In particular configurations, searching device 106 may not comprise ranking device 112. In other configurations, sharing device 108 may not comprise repository presenting device 119. In still other configurations, one or more of module presenting device 104, option presenting device 105, video searching device 106, video recording device 107, and video sharing device 108 may be implemented on one or more different CPUs, which may be comprised in devices 4 or other devices.

I/O device 103 may receive one or more of data from networks 1, data from other devices and sensors connected to system 100, and input from a user and provide such information to CPU 102. I/O device 103 may transmit data to networks 1, may transmit data to other devices connected to system 100, and may transmit information to a user (e.g., display the information, send an e-mail, make a sound). Further, I/O device 103 may implement one or more of wireless and wired communication between system 100 and other devices.

Figure 4:
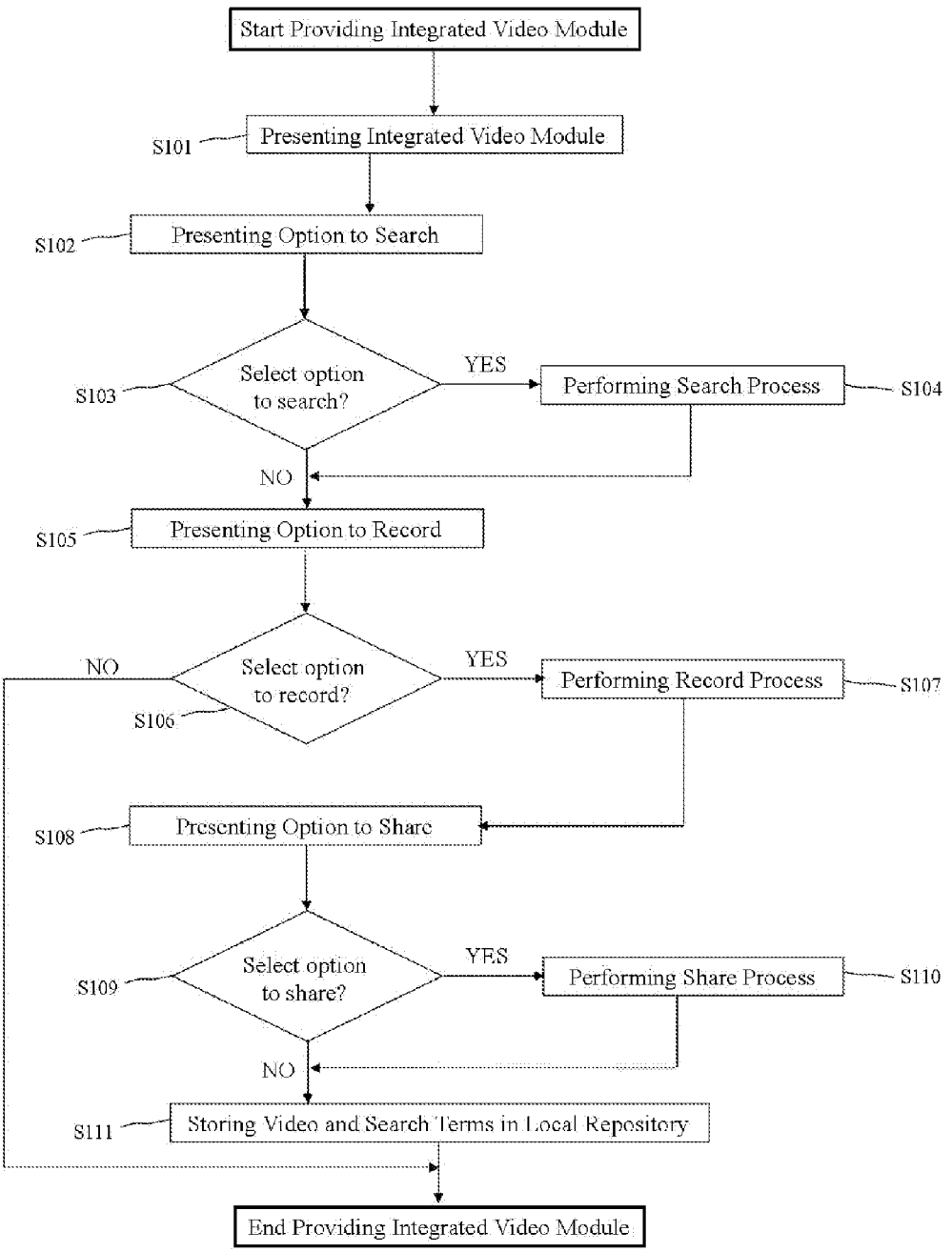
FIG. 4 illustrates a first process of presenting, within an application, an integrated video module.
Figure 5:
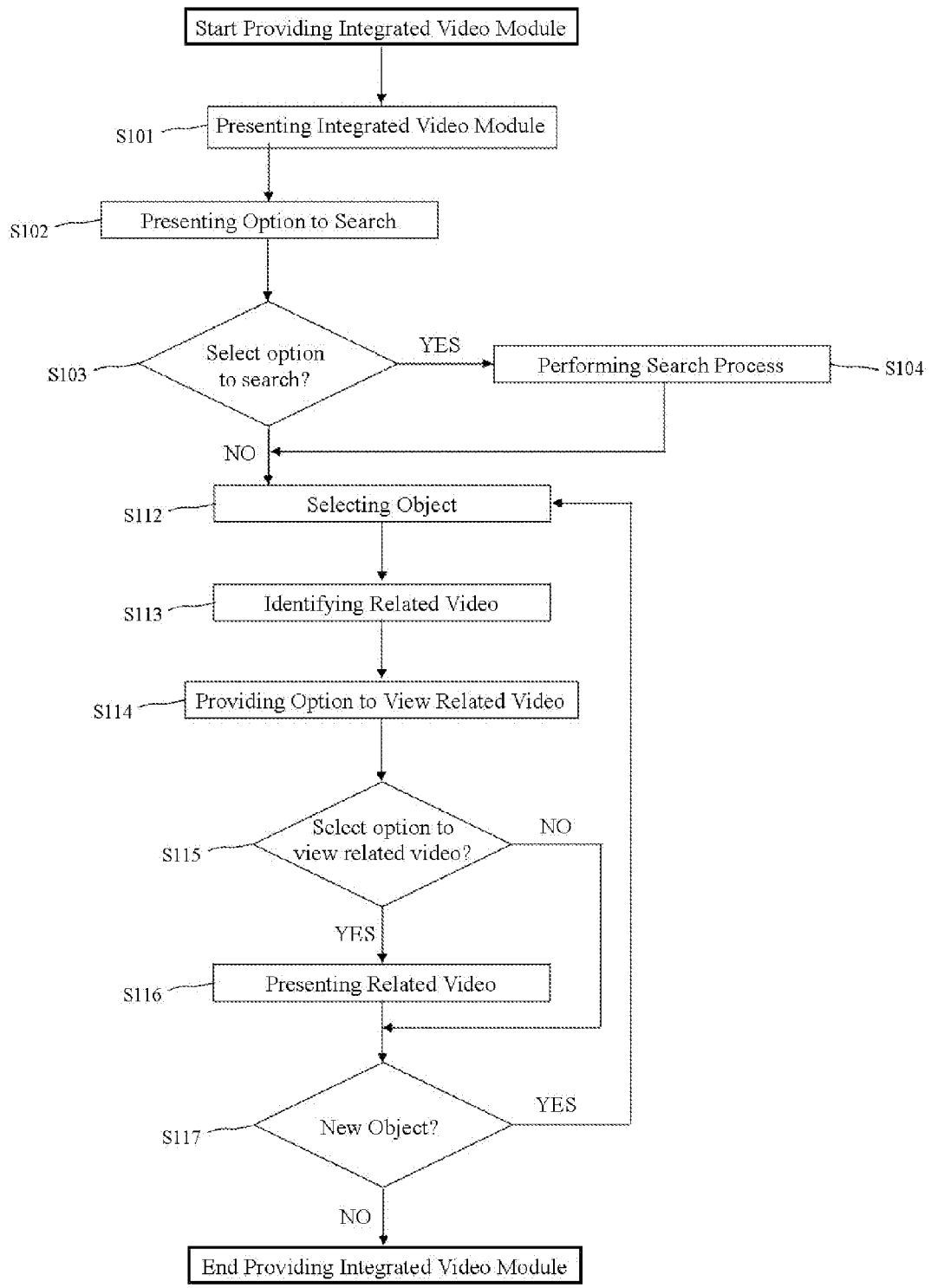
FIG. 5 illustrates a second process of presenting, within an application, an integrated video module.
Figure 6:
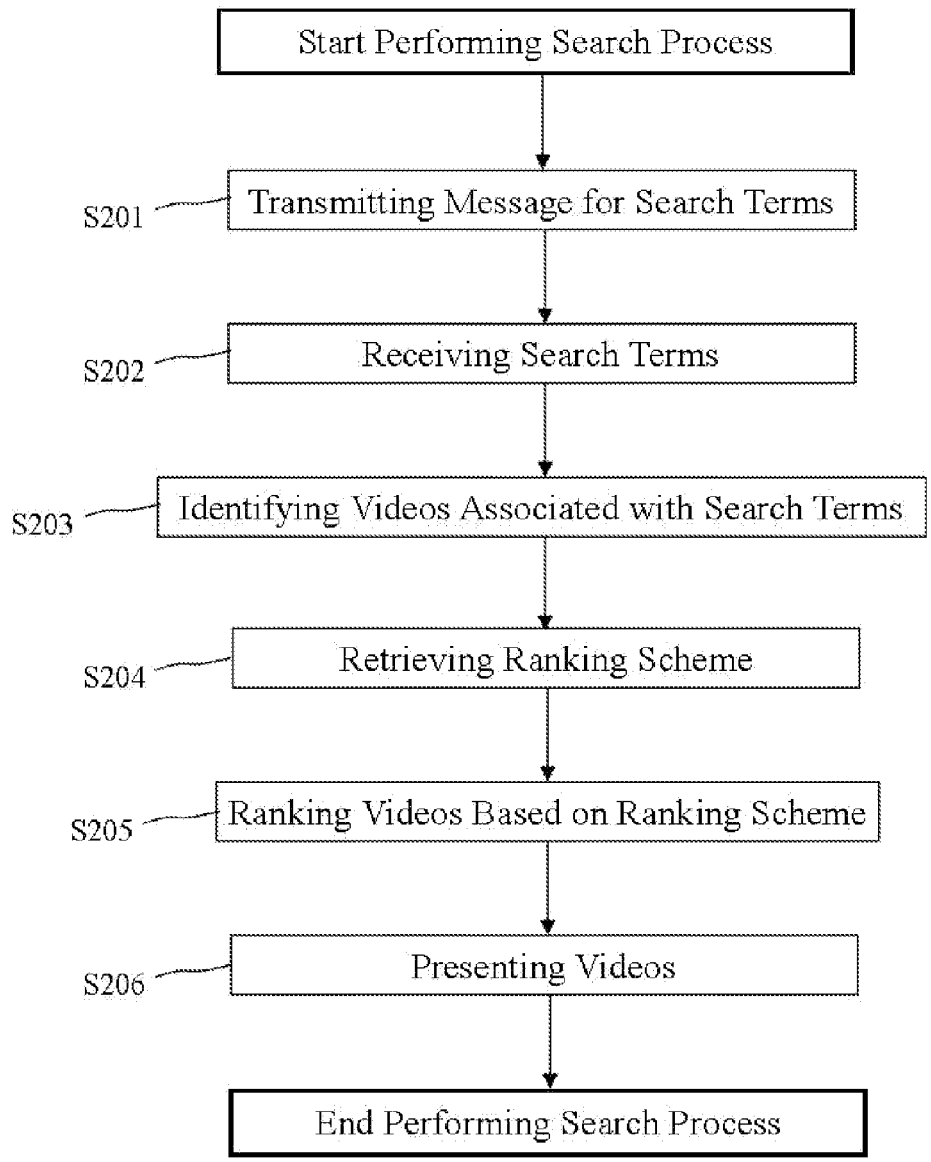
FIG. 6 illustrates a process of searching for videos.

Referring now to FIG. 4-8, processes performed by module presenting device 104, option presenting device 105, video searching device 106, video recording device 107, video sharing device 108, and related video device 121 now are described. FIG. 4 depicts a process of presenting, within an application, an integrated video module and presenting options to search for videos (e.g., via a search element of an integrated video module), to record a video (e.g., via a record element of an integrated video module), and to share a video (e.g., via a publish element of an integrated video module). In S101, module presenting device 104 may present, within an application, an integrated video module. The integrated video module may be integrated into the application. The application may be computer software that allows a user to perform one or more actions. The user may be running the application on a device. The application may comprise one or more objects. The one or more objects may be important elements of the application. In S102, option presenting device 105 may present an option to search for a first video. Presenting the option to search for a first video may comprise, for example, displaying a notification that asks the user whether he would like to search for a first video. When the option to search for a first video is selected (S103: YES), then the process may proceed to S104, and video searching device 106, operating as first message transmitting device 109, first search term receiving device 110, video identifying device 111, ranking device 112, and video presenting device 113, may search for a first video. Video searching device 106 may be a search element of the integrated video module. Selecting the option to search for the first video may generate a request to search for a video; thus, when the option to search is selected, video searching device 106 may receive a request to search for a video. In S104, video searching device 106 may transmit a message. The message may ask the user for one or more search terms that correspond to the first video. Video searching device 106 may receive the one or more search terms from the user and use the one or more search terms to identify one or more videos. The one or more videos may be videos that are each associated with at least one of the one or more search terms. Video searching device 106 may then present the one or more videos to the user. FIG. 6, described below, provides a more detailed view of S104.

Figure 7:
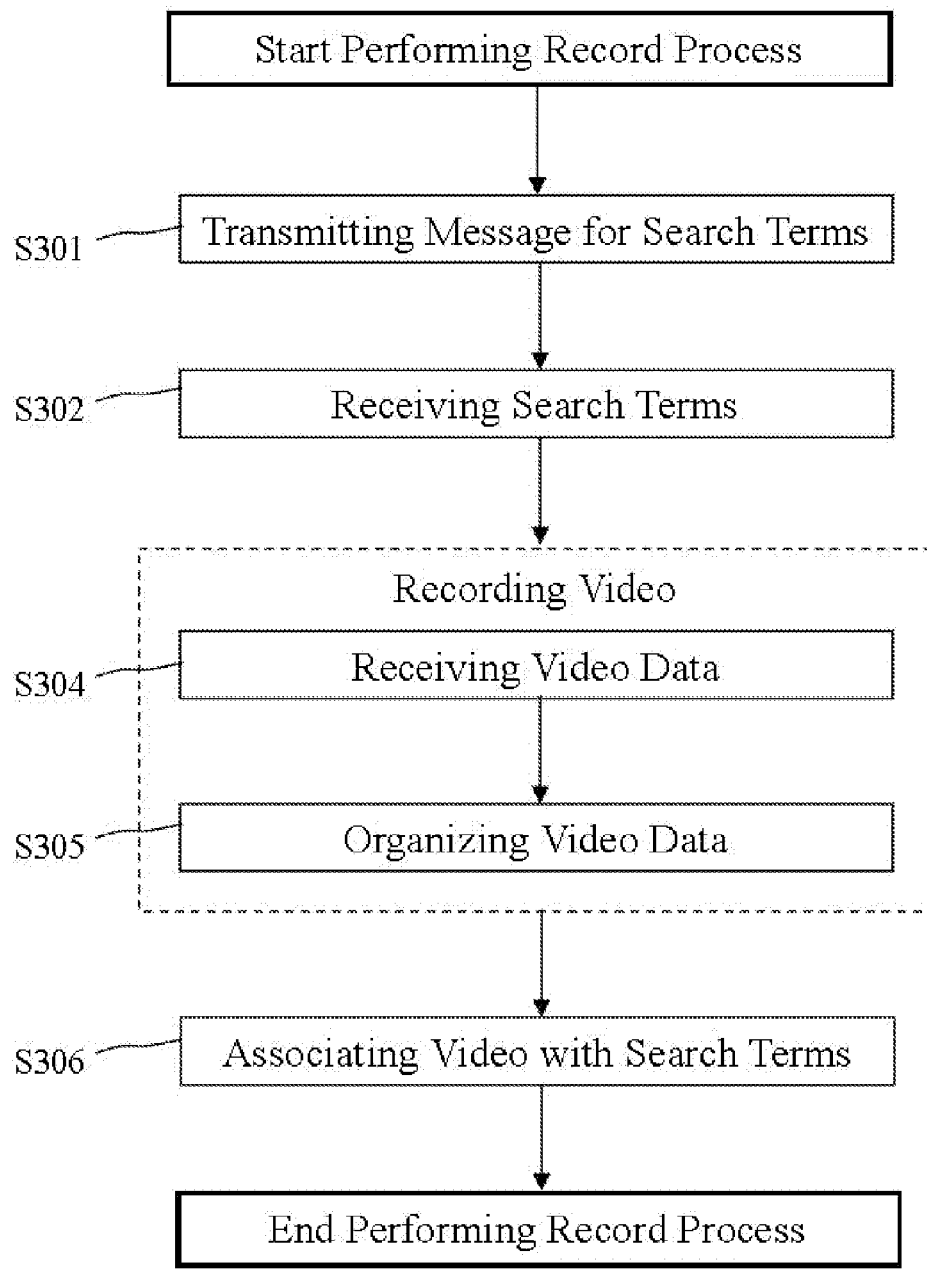
FIG. 7 illustrates a process of recording a video.

When the option to search for a first video is not selected (S103: NO), then the process may proceed to S105. In S105, option presenting device 105 may present an option to record a second video. Similar to presenting the option to search for a first video, presenting the option to record a second video may comprise, for example, displaying a notification that asks the user whether he would like to record a second video. When the option to record a second video is selected (S106: YES), then the process may proceed to S107, and video recording device 107, operating as second message transmitting device 115, second search term receiving device 116, recording device 117, and association device 118, may record a second video. Video recording device 107 may be a record element of the integrated video module. Selecting the option to record the second video may generate a request to record the second video; thus, when the option to record is selected, video recording device 107 may receive a request to record the second video. When the option to record a second video is not selected (S106: NO), then the process may terminate. In S107, video recording device 107 may transmit a message. The message may ask the user for one or more search terms that correspond to the second video. These one or more search terms may be referred to as "one or more further search terms." Video recording device 107 may receive the one or more further search terms from the user. Video recording device 107 may then record the second video and associate the second video with the one or more further search terms. FIG. 7, described below, provides a more detailed view of S107.

Figure 8:
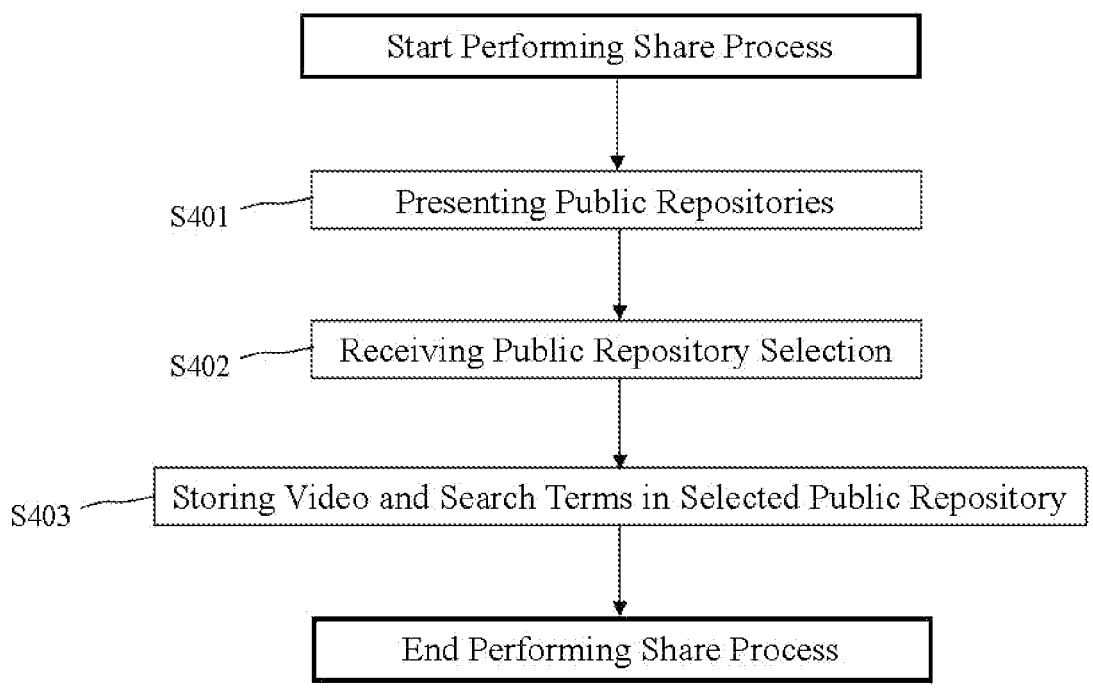
FIG. 8 illustrates a process of sharing a video.

In S108, option presenting device 105 may present an option to share the second video. Similar to presenting the options above, presenting the option to share the second video may comprise, for example, displaying a notification that asks the user whether he would like to share the second video. When the option to share the second video is selected (S109: YES), then the process may proceed to S110, and video sharing device 108, operating as repository presenting device 119 and storing device 120, may share the second video. Video sharing device 108 may be a publish element of the integrated video module. Selecting the option to share the second video may generate a request to share the second video; thus, when the option to share is selected, video sharing device 108 may receive a request to share the second video. In S110, video sharing device 108 may present one or more public repositories to the user. As described above, the one or more public repositories may comprise a physical or a logical memory that is accessible by a group of users that are running the application on different devices. The one or more public repositories may be located on the device that is running the application. Alternatively, the one or more public repositories may be located on a remote device. Examples of a public repository include a remote server and online storage. The user may select one of the one or more public repositories to store the second video in. After the user makes a selection, video sharing device 108 may store the second video and the search terms in the selected public repository. FIG. 8, described below, provides a more detailed view of S110.

When the option to share the second video is not selected (S109: NO), then the process may proceed to S111. In S111, sharing device 108 may store the second video and the one or more search terms in a local repository. The local repository may be a physical or a logical memory that is only accessible by the user. The local repository may be directly connected to the device that the user is using to run the application. Examples of a local repository include a hard drive on the device that is running the application and a memory card connected to such device. After the second video and the one or more search terms are stored, then the process may terminate.

In certain configurations, S102/S103 and S105/S106 may be performed concurrently. Option presenting device 104 may present an option to search for a first video and an option to record a second video at the same time, and the user may select either option. If the user selects the option to search for a first video (S103: YES), then the process may proceed to S104. Alternatively, if the user selects the option to record a second video (S106: YES), then the process may proceed to S107. In other configurations, S105 through S11 may be performed before S102 through S104. In particular configurations, S108 through S110 may be omitted and the process may proceed from S107 to S111. In other configurations, S108 through S110 may be performed again after S111. Option presenting device 104 may present an option to share the second video to the user again. In such configurations, the second video may already be stored in a local repository or one or more public repositories. The user may select the option to share the second video again because the user would like to store the second video in a different local or public repository. In other configurations, S105 through S111 may be omitted, and the process may terminate after S104. In still other configurations, S102 through S104 may be omitted, and the process may proceed from S101 to S105. In such configurations, S108 through S110 may be omitted and the process may proceed from S107 to S11.

Referring now to FIG. 5, a process of presenting, within an application, an integrated video module, presenting an option to search for videos, identifying a related video for each object of the application, and providing an option to view the related video for each object, now is described. As described above, in S101-S104, module presenting device 104 may present, within the application, an integrated video module, option presenting device 105 may present an option to search for a first video, and video searching device 106 may search for a first video when the option to search for a first video is selected. In S112-S117, related video device 121, operating as related video identifying device 122, providing device 123, and related video presenting device 124, may identify a related video for each object in the application, provide an option to view the related video for each object, and present the related video for a particular object to the user when he selects the option to view the related video for that object. Related video device 121 may be an object help element of the integrated video module. As described above, an object may be an important element of the application (e.g., a window, a menu, a toolbar, a control). In S112, related video identifying device 122 may select a first object. In S113, related video identifying device 122 may identify a related video for the first object. The related video may be stored in an accessible repository. The accessible repository may be a memory that the user can currently access on the device that is running the application. The accessible repository may comprise a local repository or a public repository. The related video may be a video that is associated with a search term, wherein the search term is the object's name or a similar name that corresponds to the object.

In S114, providing device 123 may provide an option to view the related video. Providing the option to view the related video may comprise displaying a button or an icon. For example, if the object is a window, providing device 123 may display a button with the text "View Video Associated with Window" or display a question mark icon on the window's title bar. The user may then select the option to view the related video by clicking on the button or the icon. If the user selects the option to view the related video (S115: YES), then the process may proceed to S116, and related video presenting device 123 may present the related video. Selecting the option to view the related video may generate a request to view the related video; thus, if the user selects the option to view, then related video presenting device 123 may receive a request to view the related video. If the user does not select the option to view the related video (S115: NO), then the process may proceed to S117. Presenting the related video may comprise playing the related video on a display. Alternatively, presenting the related video may comprise displaying a name or header associated with the related video. The display may be a display connected to the device that is running the application. In S117, related video identifying device 122 may then determine whether the application has additional objects. Determining whether the application has additional objects may comprise referencing a predefined list of objects. The predefined list may comprise objects that are specific to the application, general objects (i.e., objects that may exist in many applications), or both. Objects may be added to the predefined list by the user, another user, or another party (e.g., a service provider).

If related video identifying device 122 determines that there are additional objects (S117: YES), then the process may proceed back to S112. The process may then repeat S112 through S117 until related video identifying device 122 determines that the application has no additional objects. If related video identifying device 122 determines that there are no additional objects (S117: NO), then the process may terminate.

In certain configurations, the process depicted in FIG. 5 may also include S105 through S111. In such configurations, S105 through S111 may be performed before S102, after S104 and before S112, or after S117. Moreover, in such configurations, S112 through S117 may be performed before, during, or after any of the other steps (i.e., S101-S111).

Referring now to FIG. 6, which provides a detailed view of S104, video searching device 106, operating as first message transmitting device 109, first search term receiving device 110, video identifying device 111, ranking device 112, and video presenting device 113, may search for a first video. In S201, first message transmitting device 109 may transmit a message to the user. The message may ask for one or more search terms corresponding to the first video. In S202, first search term receiving device 110 may receive the one or more search terms from the user. The one or more search terms may comprise one or more headers, key phrases, and names of objects. A header may be a name or title that is associated with the first video. A key phrase may be a word or phrase that describes useful information related to the first video (e.g., a name of a tool that is used in the first video, a description of a task that is performed in the first video and a reason for performing the task). A name of an object may correspond to an object in the application that is related to the first video (e.g., an object that is used in the first video, an object that is described in the first video). For example, if an user wants to search for a first video that includes information on how to migrate datasets in the application, the user may provide first search term receiving device 110 with a header "How to Migrate a Dataset," key words such as "Dataset" and "Migration," and a name of an object that is used for migrating a dataset.

In S203, video identifying device 111 may identify a plurality of videos. The plurality of videos may be a plurality of distinct videos, wherein each of the plurality of distinct videos is different from one another. Each of the plurality of videos may be stored in an accessible repository and may be associated with at least one of the one or more search terms. As described above, the accessible repository may be a memory that the user can currently access on the device that is running the application. The accessible repository may comprise a local repository or a public repository. The local repository may be a physical or a logical memory that is only accessible by the user, and the public repository may comprise a physical or a logical memory that is accessible by a group of users that are running the application on different devices. In S205 and S206, ranking device 112 may then retrieve a predetermined scheme and rank the plurality of videos based on the predetermined scheme. The predetermined scheme may be referred to as a "ranking scheme." The ranking scheme may comprise, for example, an expected relevance ranking, an alphabetical ordering, and a ranking tied to user information (e.g., highest user ratings, highest user views, last viewed or accessed date). After the plurality of videos is ranked, video presenting device 113 may then present the plurality of videos to the user in S206. Presenting the plurality of videos may comprise, for example, displaying a list of the ranked videos on a display such as a mobile phone, a tablet computer, a laptop computer, a desktop computer, an audio receiving system, a television, or another type of terminal device configured to display video data or play audio data. Displaying a list of the ranked videos may comprise displaying, for each of the ranked videos, a header that is associated with that video in the list. Alternatively, presenting the plurality of videos may comprise playing each of the ranked videos or a subset of the ranked videos (e.g., videos with the highest few rankings) on a display, one after another in the order that they are ranked, to the user.

In certain configurations, video identifying device 111 may only identify a particular video. In such configurations, S204 and S205 may be omitted, and video presenting device 113 may present the particular video in S206. Similar to the process depicted in FIG. 6, presenting the particular video may comprise at least one of displaying a header associated with the particular video and playing the particular video on a display.

Referring now to FIG. 7, which provides a detailed view of S107, video recording device 107, operating as second message transmitting device 115, second search term receiving device 116, recording device 117, and association device 118, may record a second video. In S301, second message transmitting device 115 may transmit a message to the user. The message may ask for one or more search terms corresponding to the second video. In S302, second search term receiving device 116 may receive the one or more search terms from the user. The one or more search terms may comprise one or more headers, key phrases, and names of objects. As described above, a header may be a name or title that describes with the second video; a key phrase may be a word or a phrase that describes useful or important information related to the second video; and a name of an object may correspond to an object in the application that is related to the second video.

In S304 and S305, recording device 117 may record the second video. Specifically, in S304, recording device 117 may receive video data corresponding to a view of the application. The video data may comprise one or more images and audio clips. In S305, recording device 117 may organize the video data based on an order that the video data is received. For example, if a first image is received first and a second image is received second, then the two images may be organized as the first image followed by the second image. As another example, if a plurality of images is received at the same time that an audio clip is received, then the plurality of images and the audio clip may be organized together. In S306, association device 118 may then associate the second video with the one or more search terms. For example, association device 118 may add metadata to the second video, wherein the metadata comprises the one or more search terms.

Referring now to FIG. 8, which provides a detailed view of S110, video sharing device 107, operating as repository presenting device 119 and storing device 120, may share the second video. In S401, repository presenting device 119 may present one or more public repositories to store the second video in. As described above, the one or more public repositories may comprise a physical or a logical memory that is accessible by a group of users that are running the application on different devices. The one or more public repositories may be located on the device that is running the application. Alternatively, the one or more public repositories may be located on a remote device. In S402, the user may select one of the one or more public repositories to store the second video in. Storing device 120 may receive the user's public repository selection. In S403, storing device 120 may then store the second video and the one or more search terms in the selected public repository.

The flowcharts and diagrams in FIGS. 1-8 illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to comprise any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For example, this disclosure comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. The aspects of the disclosure herein were chosen and described in order to best explain the principles of the disclosure and the practical application and to enable others of ordinary skill in the art to understand the disclosure with various modifications as are suited to the particular use contemplated.

What is claimed is:

1. A method comprising:
presenting, within an application, an integrated video module, the integrated video module integrated into the application;
receiving one or more search terms;
receiving a request to search for a video;
identifying, via a search element of the integrated video module, a particular video associated with at least one of the one or more search terms and stored in an accessible repository, in response to receiving a request to search for a video;
presenting, via the search element, the particular video;
receiving one or more further search terms;
receiving a request from a user to record a user video;
recording, via a record element of the integrated video module, the user video in response to receiving a request to record the user video;
wherein the user video comprises a recorded guide of the user instructing on how to perform a task of the application, and the recorded guide includes a video image view of the application; and
associating, via the record element, the user video with the one or more further search terms.

2. The method of claim 1, further comprising:
storing, via a publish element of the integrated video module, the user video and the one or more further search terms in a local repository; and
storing, via the publish element, the user video and the one or more further search terms in a public repository in response to receiving a request to share the video.

3. The method of claim 1, further comprising:
presenting, via the publish element, a plurality of public repositories in response to receiving a request to share the user video;
wherein storing, via the publish element, the user video and the one or more further search terms comprises storing, via the publish element, the user video and the one or more further search terms in a repository selected from the one or more public repositories.

4. The method of claim 1, wherein the one or more search terms comprise at least one of: a header, a key phrase, and a name of an object; and
wherein the accessible repository is selected from the group consisting of: a local repository, and a public repository.

5. The method of claim 1, further comprising ranking a plurality of distinct videos based on a predetermined scheme;
wherein identifying, via the search element, a particular video comprises identifying, via the search element, the plurality of distinct videos, each of the plurality of distinct videos associated with at least one of the one or more search terms and stored in an accessible repository;
wherein presenting, via the search element, the particular video comprises presenting, via the search element, the plurality of distinct videos as ranked.

6. The method of claim 1, further comprising:
identifying, via an object help element of the integrated video module, a related video, the related video associated with a name corresponding to an object and stored in an accessible repository;
presenting, via the object help element, the related video in response to receiving a request to view the related video;
wherein the application comprises the object.

7. The method of claim 1, wherein presenting, via the search element, the particular video comprises at least one of:
displaying a header associated with the particular video, and
playing the particular video on a display.

8. A computer program product comprising:
a non-transitory computer readable storage medium having computer readable program code embodied therewith, the computer readable program code comprising:
computer readable program code configured to present, within an application, an integrated video module, the integrated video module integrated into the application;
computer readable program code configured to receive one or more search terms;
computer readable program code configured to identify, via a search element of the integrated video module, a particular video associated with at least one of the one or more search terms and stored in an accessible repository in response to receiving a request to search for a video, the particular video comprising a view of the application;
computer readable program code configured to present, via the search element, the particular video;
computer readable program code configured to receive one or more further search terms;
computer readable program code configured to record, via a record element of the integrated video module, a user video in response to receiving from a user, a request to record the video, wherein the user video comprises a recorded guide of the user instructing on how to perform a task of the application, and the recorded guide includes a video view of the application; and
computer readable program code configured to associate, via the record element, the user video with the one or more further search terms.

9. The computer program product of claim 8, further comprising:
computer readable program code configured to store, via a publish element of the integrated video module, the user video and the one or more further search terms in a local repository; and
computer readable program code configured to store, via the publish element, the user video and the one or more further search terms in a public repository in response to receiving a request to share the video.

10. The computer program product of claim 9, further comprising:
computer readable program code configured to present, via the publish element, a plurality of public repositories in response to receiving a request to share the user video;
wherein the computer readable program code configured to store, via the publish element, the user video and the one or more further search terms comprises computer readable program code configured to store, via the publish element, the user video and the one or more further search terms in a repository selected from the one or more public repositories.

11. The computer program product of claim 8, wherein the computer readable program code configured to record, via the record element, a user video comprises:
    computer readable program code configured to receive, via the record element, video data corresponding to a view of the application; and
    computer readable program code configured to organize, via the record element, the video data based on an order that the video data is received;
    wherein the video data comprises at least one of: an image and an audio clip.

12. The computer program product of claim 8, wherein the one or more search terms comprise at least one of: a header, a key phrase, and a name of an object; and
    wherein the accessible repository is selected from the group consisting of: a local repository, and a public repository.

13. The computer program product of claim 8, further comprising:
    computer readable program code configured to rank a plurality of distinct videos based on a predetermined scheme;
    wherein the computer readable program code configured to identify, via the search element, a particular video comprises computer readable program code configured to identify, via the search element, the plurality of distinct videos, each of the plurality of distinct videos associated with at least one of the one or more search terms and stored in an accessible repository; and
    wherein the computer readable program code configured to present via the search element the particular video comprises computer readable program code configured to present via the search element the plurality of distinct videos as ranked.

14. The computer program product of claim 8, further comprising:
    computer readable program code configured to identify, via an object help element of the integrated video module, a related video, the related video associated with a name corresponding to an object and stored in an accessible repository; and
    computer readable program code configured to present, via the object help element, the related video in response to receiving a request to view the related video;
    wherein the application comprises the object.

15. The computer program product of claim 8, wherein the computer readable program code configured to present, via the search element, the particular video comprises at least one of:
    computer readable program code configured to display a header associated with the particular video, and
    computer readable program code configured to play the particular video on a display.

16. A computer program product comprising:
    a non-transitory computer readable storage medium having computer readable program code embodied therewith, the computer readable program code comprising:
        computer readable program code configured to present, within an application, an integrated video module, the integrated video module integrated into the application;
        computer readable program code configured to receive one or more search terms;
        computer readable program code configured to record, via a record element of the integrated video module, a video comprising a view of the application in response to receiving from a user, a request to record the video, wherein the user video comprises a recorded guide of the user instructing on how to perform a task of the application, and the recorded guide includes a video view of the application; and
        computer readable program code configured to associate, via the record element, the video with the one or more search terms.

17. The computer program product of claim 16 further comprising:
    computer readable program code configured to store, via a publish element of the integrated video module, the video and the one or more further search terms in a local repository; and
    computer readable program code configured to store, via the publish element, the video and the one or more further search terms in a public repository in response to receiving a request to share the video.

18. The computer program product of claim 17, further comprising:
    computer readable program code configured to present, via the publish element, a plurality of public repositories in response to receiving a request to share the video;
    wherein the computer readable program code configured to store, via the publish element, the video and the one or more further search terms comprises computer readable program code configured to store, via the publish element, the video and the one or more further search terms in a repository selected from the one or more public repositories.

19. The computer program product according to claim 16, wherein the one or more search terms comprise at least one of: a header, a key phrase, and a name of an object.

20. The computer program product according to claim 16, wherein the computer readable program code configured to record, via the record element, a video comprises:
    computer readable program code configured to receive, via the record element, video data corresponding to a view of the application; and
    computer readable program code configured to organize, via the record element, the video data based on an order that the video data is received;
    wherein the video data comprises at least one of: an image and an audio clip.

* * * * *